United States Patent
Laye et al.

(10) Patent No.: US 7,611,743 B2
(45) Date of Patent: Nov. 3, 2009

(54) LOW PROTEIN CREAM CHEESE

(75) Inventors: Isabelle Marie-Francoise Laye, Wheeling, IL (US); Alice S. Cha, Northbrook, IL (US); Jimbay P. Loh, Green Oaks, IL (US); Ted Riley Lindstrom, Lake Forest, IL (US); Ana Patricia Rodriguez, Gurnee, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 613 days.

(21) Appl. No.: 11/062,376

(22) Filed: Feb. 22, 2005

(65) Prior Publication Data

US 2005/0214430 A1    Sep. 29, 2005

Related U.S. Application Data

(60) Provisional application No. 60/555,904, filed on Mar. 24, 2004.

(51) Int. Cl.
*A23C 19/00* (2006.01)

(52) U.S. Cl. .................. 426/582; 426/573; 426/580

(58) Field of Classification Search ................ 426/573, 426/575, 576, 577, 578, 580, 582
See application file for complete search history.

(56) References Cited

U.S. PATENT DOCUMENTS

| | | | |
|---|---|---|---|
| 2,387,276 A | 10/1945 | Link | |
| 4,597,971 A | 7/1986 | Davis | |
| 4,749,584 A | 6/1988 | Wirchansky et al. | |
| 5,079,024 A | 1/1992 | Crane | |
| 5,180,604 A | 1/1993 | Crane et al. | |
| 5,656,320 A | 8/1997 | Cheng et al. | |
| 6,093,439 A | 7/2000 | Whaley et al. | |
| 6,406,736 B1 | 6/2002 | Han | |
| 6,416,797 B1 | 7/2002 | Han et al. | |
| 6,419,975 B1 | 7/2002 | Han et al. | |
| 6,558,716 B1 | 5/2003 | Kent et al. | |
| 6,558,761 B1 | 5/2003 | Vandevijver et al. | |
| 6,913,774 B2 * | 7/2005 | Cha et al. | 426/36 |
| 2002/0039613 A1 | 4/2002 | Bhatia et al. | |

FOREIGN PATENT DOCUMENTS

| | | |
|---|---|---|
| EP | 0 289 096 | 11/1988 |
| EP | 1 364 583 | 11/2003 |
| EP | 1 386 540 | 2/2004 |
| EP | 1 472 931 | 11/2004 |
| WO | WO 2004/017742 | 3/2004 |

* cited by examiner

*Primary Examiner*—Leslie Wong
(74) *Attorney, Agent, or Firm*—Fitch, Even, Tabin & Flannery

(57) ABSTRACT

The present invention is directed to cream cheese compositions in which the protein level is reduced to below 6.5 percent, and preferably between about 5 to about 6 percent, with acceptable baking properties. In order to obtain such a cream cheese composition with acceptable baking properties, a stabilizer composition is added to the low protein cream cheese. The stabilizer composition comprises a first stabilizer and a second stabilizer, wherein the first stabilizer is selected from the group consisting of carob gum and tara gum and the second stabilizer is selected from the group consisting of xanthan gum, carrageenan, maltodextrin, pectin, inulin, starch, gelatin, and agar.

22 Claims, No Drawings

LOW PROTEIN CREAM CHEESE

RELATED APPLICATION

This application is based on, and claims benefit of, U.S. Provisional Application Ser. No. 60/555,904, filed on Mar. 24, 2004, which is hereby incorporated by reference.

FIELD OF THE INVENTION

The present invention relates to cream cheese products and more particularly to cream cheese compositions having relatively low protein contents (i.e., below about 6.5 percent and preferably between about 5 to about 6 percent) and which have acceptable baking properties. The protein in these cream cheese compositions is preferably at least about 25 percent whey protein.

BACKGROUND OF THE INVENTION

Cream cheese is made by mixing sweet milk or skim milk with sweet cream to a desired fat content (usually 10 to 16 percent). The mixture is pasteurized, homogenized and cooled to a setting temperature (typically 62-92° F.). It is then inoculated with lactic acid bacteria and incubated until sufficient acidity has developed to cause the separation of curd from whey. The coagulation process may, optionally, be aided by the addition of a small amount of rennet. After the curd is separated from whey (e.g., using a centrifugal separator; see, U.S. Pat. No. 2,387,276), stabilizers, salt, and other ingredients are added. Finally, the product is packaged and chilled. Many variations to this process have been introduced through the years (see, e.g., U.S. Pat. No. 5,656,320; U.S. Pat. No. 5,079,024; U.S. Pat. No. 5,180,604; U.S. Pat. No. 6,419,975; U.S. Pat. No. 6,406,736; U.S. Pat. No. 6,558,761; U.S. Pat. No. 6,416,797; and U.S. Pat. No. 4,597,971).

Under the current Standards of Identity, cream cheese is required to contain at least 33 percent fat and no more than 55 percent moisture. One way to maintain these parameters and to reduce raw material costs is to lower the amount of protein present. However, when protein is reduced significantly below about 6.5 percent, baking properties tend to be adversely affected, particularly with respect to the firmness of baked goods. For example, New York-style cheesecakes made using cream cheese with a low content of protein may appear uncooked in the center. For this reason, the amount of protein present in cream cheese products has remained relatively high.

It would be desirable, therefore, to provide a low protein cream cheese which can be used to make cheesecakes having similar organoleptic properties and texture to cheesecakes made with conventional cream cheese products having high protein levels. The present invention provides such a low protein cream cheese.

SUMMARY OF THE INVENTION

The present invention provides cream cheese compositions containing at least two stabilizers that allow the protein level to be reduced without a substantial reduction with respect to baking performance. Cheesecakes made using such low protein cream cheeses appear fully cooked and maintain a desirable firmness in their centers.

The present invention provides a low protein cream cheese composition comprising: (a) about 33 to about 40 percent fat; (b) about 50 to about 55 percent moisture; (c) less than about 6.5 percent protein; and (d) about 0.1 to about 0.9 percent of a stabilizer composition comprising a first stabilizer and a second stabilizer, wherein the first stabilizer is selected from the group consisting of carob gum and tara gum and the second stabilizer is selected from the group consisting of xanthan gum, carrageenan, maltodextrin, pectin, inulin, starch, gelatin, and agar. Preferably, the second stabilizer includes two selections from the group consisting of xanthan gum, carrageenan, maltodextrin, pectin, inulin, starch, gelatin, and agar. More preferably, the first stabilizer is carob gum and the second stabilizer includes xanthan gum and, optionally, a third stabilizer selected from the group consisting of xanthan gum, carrageenan, maltodextrin, pectin, inulin, starch, gelatin, and agar.

The low protein cream cheese compositions of this invention have acceptable baking properties and are ideally suited for the preparation of cheesecake products. For example, the low protein cream cheese composition of this invention can provide a New York style cheesecake with yield stress at its center of the cheesecake above 625 pascals, and generally in the range of about 800 to 1200 pascals. For comparison purposes, cream cheese having about 5 percent protein, but without the stabilizer composition used in this present invention, generally provides New York style cheesecake with a yield stress at its center below about 625 pascals and more typically at about 550 pascals. Also for comparison purposes, conventional cream cheese (e.g., 6.5 percent protein with carob as a stabilizer) provides a New York style cheesecake with yield stress at its center above 800 pascals and typically at 1000 pascals.

Generally, the cream cheese composition contains about 0.1 to about 0.9 percent of the stabilizer composition. Preferably, the stabilizer composition contains about 0.1 to about 0.5 percent of the first stabilizer and about 0.01 to about 0.15 percent of the second stabilizer. More preferably, the stabilizer composition contains about 0.15 to about 0.3 percent of the first stabilizer and about 0.06 to about 0.1 percent of the second stabilizer, and 0 to about 0.25 percent of the third stabilizer. Preferably, the first stabilizer is carob gum and the second stabilizer is xanthan gum.

In another aspect, the invention is directed to cream cheese compositions having about 33 to about 40 percent fat, about 50 to about 55 percent moisture, about 5.0 about 6.0 percent protein, and a combination of stabilizers which is sufficient to provide a cream cheese which, when used to prepare a New York style cheesecake, provides a New York style cheesecake have a stress value at its center comparable to a conventional New York style cheesecake prepared using conventional cream cheese (i.e., about 6.5 percent protein and containing carob gum as the stabilizer). Typically, the low protein cream cheese composition of this invention can provide a New York style cheesecake with yield stress at its center of the cheesecake above 625 pascals, and generally in the range of about 800 to about 1200 pascals. For comparison purposes, cream cheese having about 5 percent protein, but without the stabilizer composition used in this present invention, generally provides New York style cheesecake with a yield stress at its center below about 625 pascals and more typically at about 550 pascals. Also for comparison purposes, conventional cream cheese (e.g., 6.5 percent protein with carob as a stabilizer) provides a New York style cheesecake with yield stress at its center above 800 pascals and typically at 1000 pascals. Stress values may be determined using standard rheological instruments and the content of stabilizers may be determined from compositions and methods well known in the art. The most preferred stabilizers are mixtures of carob gum as the first stabilizer and xanthan gum as the second stabilizer.

Generally it is preferred that at least 25 percent (e.g., about 25 to about 40 percent) of the protein in the cream cheese composition be derived from whey. Dried whey, whey protein, or other whey protein containing materials can be added to the cream cheese compositions during processing to achieve the desired whey protein content.

In another aspect, the invention is directed to a method of making a low protein cream cheese, comprising: (a) preparing a mixture of cream and a protein source; (b) homogenizing the mixture to form a homogenized mixture; (c) heating the homogenized mixture to a setting temperature of about 62 to about 92° F.; (d) adding a cream cheese culture to the homogenized mixture; (e) incubating the mixture of step (d) for a period of about 8 to about 18 hours at a setting temperature and to form curds and whey; (f) separating the curds from the whey formed in step e); and (e) adding a stabilizer composition to the separated curds to form the low protein cream cheese; wherein the low protein cream cheese comprises about 33 to about 40 percent fat; about 50 to about 55 percent moisture; less than about 6.5 percent protein (preferable about 5.0 to about 6.0 percent); and about 0.1 to about 0.9 percent of the stabilizer composition; wherein the stabilizer composition comprises a first stabilizer and a second stabilizer; and wherein the first stabilizer is selected from the group consisting of carob gum and tara gum and the second stabilizer is selected from the group consisting of xanthan gum, carrageenan, maltodextrin, pectin, inulin, starch, gelatin, and agar. Preferably, the second stabilizer includes two selections from the group consisting of xanthan gum, carrageenan, maltodextrin, pectin, inulin, starch, gelatin, and agar. More preferably, the first stabilizer is carob gum and the second stabilizer includes xanthan gum and, optionally, a third stabilizer selected from the group consisting of carrageenan, maltodextrin, pectin, inulin, starch, gelatin, and agar. Preferably the cream and protein source mixture is pasteurized before homogenization.

DETAILED DESCRIPTION

The present invention provides cream cheese compositions containing at least two stabilizers that allow the protein level to be reduced without a substantial reduction with respect to baking performance. Cheesecakes made using such cream cheeses appear fully cooked and maintain a desirable firmness in their centers.

The stabilizer composition used in the present invention contains at least a first stabilizer and a second stabilizer. The first stabilizer is selected from the group consisting of carob gum and tara gum and the second stabilizer is selected from the group consisting of xanthan gum, carrageenan, maltodextrin, pectin, inulin, starch, gelatin, and agar. Mixtures of such first stabilizers can also be used.

Experiments have indicated that, at protein concentrations of below 6.5 percent in cream cheese, there is a direct correlation between the protein concentration of the cream cheese and the firmness (expressed as a stress value) of cheesecakes baked using the cream cheese. The present invention is based upon the identification of specific combinations of stabilizers that can be added to cream cheeses having lower protein contents (about 5.0 to about 6.0 percent) which will provide the same desirable baking characteristics exhibited by cream cheeses with higher protein levels (e.g., 6.5 percent or more). Best results are obtained by using combinations of carob gum and xanthan gum. However, good results can also be obtained by using combinations in which either carob gum, or carob gum in combination with xanthan gum, are combined with other stabilizers such as carrageenan, maltodextrin, pectin, inulin, starch, gelatin, and agar. All of these stabilizer compounds or ingredients are commercially available and widely used in the food industry for a number of purposes.

In another embodiment, the invention is directed to a cream cheese composition containing about 33 to about 40 percent fat, about 50 to about 55 percent moisture, about 5.0 to about 6.0 percent protein, about 0.15 to about 0.3 percent carob gum, about 0.6 to about 0.1 percent xanthan gum, and 0 to about 0.35 percent of a third or additional stabilizer selected from the group consisting of carrageenan, maltodextrin, pectin, inulin, starch, gelatin, and agar. In one preferred embodiment, the stabilizer composition contains carob gum and xanthan gum and is included in the cream cheese composition at a level to provide about 0.15 to about 0.3 percent carob gum about 0.06 to about 0.1 percent xanthan gum in the cream cheese composition.

Preferred combinations of stabilizers also appear to exist for cream cheese compositions containing specific percentages of protein within the required range. For example, for cream cheese compositions containing about 6 percent protein, preferred combinations of stabilizers include about 0.17 to about 0.18 percent carob gum and about 0.06 to about 0.08 percent xanthan gum. For compositions containing about 5.75 percent protein, preferred combinations of stabilizer include about 0.18 to about 0.23 percent carob gum and about 0.07 to about 0.08 percent xanthan gum. Similarly, cream cheese compositions containing 5.5 percent protein will preferably have a combination of stabilizers selected from the group consisting of about 0.22 to about 0.24 percent carob gum and about 0.06 to about 0.08 percent xanthan gum.

Although less preferred, the present invention also includes cream cheese compositions having a similar fat, moisture, and protein content to the compositions described above but which utilize combinations of stabilizers other than carob gum and xanthan gum. For example, stabilizers in these compositions may be selected from the following combinations: about 0.15 to about 0.35 percent carob gum and about 0.01 to about 0.03 percent carrageenan; about 0.08 to about 0.28 percent carob gum, about 0.06 to about 0.08 percent xanthan gum, and about 0.01 to about 0.03 percent carrageenan; about 0.15 to about 0.35 percent carob gum and about 0.01 about to 0.03 percent pectin; about 0.15 to about 0.35 percent carob gum and about 0.15 to 0.35 percent starch; about 0.15 to about 0.25 percent carob gum and about 0.25 to 0.35 percent inulin; about 0.15 percent to about 0.25 percent carob gum and about 0.15 to about 0.35 percent gelatin; and about 0.15 to about 0.35 percent carob gum and about 0.01 to about 0.03 percent of a mixture consisting of about 50 percent xanthan, about 30 percent carob, and about 20 percent agar. The percentages of the individual ingredients in the stabilizer composition described above are based on the total weight of the cream cheese composition.

Although the cream cheese compositions described herein meet standard requirements for fat and moisture, compositions in which these parameters are varied are also compatible with the stabilizer compositions described herein. Thus, the stabilizer combinations may also be used with reduced fat cream cheeses and cream cheeses having a higher moisture content. Similarly, the invention is compatible with cream cheeses containing any of the flavorings, colorants, preservatives and other food additives used in the art. In addition, the invention may be used for low protein cream cheeses in which milk proteins are replaced with other types of protein and, in preferred embodiments, protein derived from whey constitutes a substantial portion of the total protein present.

Any method for producing cream cheese known in the art may be used to make the compositions described herein and the final product may either be in the form of a cream cheese "brick" or in a softer form more typically found in plastic containers. Similarly, the cream cheese products may either be ingested directly or used in the preparation of other foods, e.g., cheesecake, in the same way as cream cheeses having a higher protein content.

The present invention provides a method of making a cream cheese product having about 5 to about 6 percent protein and in which stress values in a New York style cheesecake prepared using the cream cheese product are maintained at a level comparable to that seen in standard New York style cheesecake prepared using a conventional cream cheese containing 6.5 percent protein. Generally, the process involves first mixing cream and a milk substrate to a desired initial fat composition (typically about 10 to about 14 percent butterfat). The preparation is then homogenized (preferably the mixture is pasteurized before homogenization), and then cooled to a setting temperature (typically about 62 to about 92° F.). A lactic acid bacterial inoculum is then added to the preparation which is then incubated at the setting temperature for a period of time sufficient to allow coagulation to occur (typically about 8 to about 18 hours). Curd is then separated from whey. Prior to packaging, a stabilizer composition selected from those described above is added along with any other ingredients, such as salt or flavoring, that may be desired.

Unless otherwise indicated, all percentages and ratios in the present specification are by weight based on the total weight of the final cream cheese product composition.

EXAMPLES

New York style cheesecakes were prepared from both inventive cream cheese (having varying protein levels) and conventional cream cheese were prepared as follows:
1. Preheat oven to 350° F.;
2. Soften appropriate cream cheese (1135 g) at room temperature for 30 minutes; cream cheese temperature should be between 48 and 52° F.;
3. Combine Salerno Graham crumbs (115 g) with Land 0 lakes melted salted butter (43 g), and granulated sugar (37 g) with mixing until evenly moistened; form crust by pressing onto the bottom of a 9-inch springform pan;
4. Bake crust for 10 minutes;
5. Place cream cheese (1135 g) in Kitchen-Aid mixer bowl; add 206 g granulated sugar, 27 g flour, and 14 g vanilla extract; mix on speed 4 for one minute while scraping and turning bowl;
6. Scrape bowl well and then mix on speed 6 an additional minute while scraping and turning bowl;
7. Add egg yolks and whites from three large eggs (150 g) one at a time with mixing at speed 1 for 20 seconds after each egg is added;
8. Blend in Breakstone's sour cream (245 g) at speed 1 for 20 seconds to form the filling;
9. Pour the filling into the baked crust;
10. Place in heated oven and bake for one hour at 350° F.;
11. Cool for two hours at room temperature; and
12. Refrigerate 12 hours.

After cooling, the yield stress was measured using Haake VT550 viscometer (Gebruder Haake GmbH, Karlsruhe, Germany) at a constant speed (0.1 rpm) for 120 seconds in the center of the cheesecake. The peak stress, reported as the "yield stress," is determined from a plot of the measured stress versus time using convention techniques.

For comparison purposes, a New York style cheesecake made with conventional cream cheese (6.5 percent protein) was fully cooked in the center with a yield stress of 1004 pascals. A New York style cheesecake with a non-inventive cream cheese having 5.5 percent protein and using only carob gum appeared uncooked in the center and had a yield stress of 614 pascals.

Example 1

Inventive Cream Cheese Composition With 5.0 Percent Protein

Cream (1011 lbs) was mixed with 1389 lbs of milk. The mixture was pasteurized, homogenized, and cultured overnight with cream cheese cultures. Upon culturing, the mixture was separated to obtain 721.5 lbs of curd with a moisture content of 56.9 percent. A blend containing 2.7 lbs of whey protein concentrate (34 percent protein), 16.35 lbs of dried whey, 5.7 lbs of salt, 1.65 lbs of carob gum, 0.6 lbs of xanthan gum, and 1.5 lbs of maltodextrin was added to the curd. The final mixture, having a composition of about 54.6 percent moisture, about 33.6 percent fat, and about 5.0 percent protein (75/25 casein to whey), was heated to 195° F. for five minutes, cooled to 185° F., held for 20 minutes, and then cooled to 45° F. for packaging.

New York style cheesecake made from this inventive cream cheese was fully cooked in the center with a yield stress of 814 pascals.

Example 2

Inventive Cream Cheese Composition With 5.5 Percent Protein

Cream (924 lbs) was mixed with 1276 lbs of milk. The mixture was pasteurized, homogenized, and cultured overnight with cream cheese cultures. Upon culturing, the mix was separated to obtain 717.45 lbs of curd with a moisture content of 56.9 percent. A blend containing 18 lbs of whey protein concentrate (34 percent protein), 7.43 lbs of dried whey, 4.88 lbs of salt, 0.65 lbs of carob gum, and 0.6 lbs of xanthan gum was added to the curd. The final mixture, having a composition of about 54.6 percent moisture, about 33.6 percent fat, and about 5.5 percent protein (70/30 casein to whey), was heated to 195° F. for five minutes, cooled to 185° F., held for 20 minutes, and then cooled to 45° F. for packaging.

New York style cheesecake made from this inventive cream cheese was fully cooked in the center with a yield stress of 673 pascals.

Example 3

Inventive Cream Cheese Composition With 5.5 Percent Protein

In another example, cream (924 lbs) was mixed with 1276 lbs of milk. The mixture was pasteurized, homogenized, and cultured overnight with cream cheese cultures. Upon culturing, the mix was separated to obtain 717.45 lbs of curd with a moisture content of 56.9 percent. A blend containing 18 lbs of whey protein concentrate (34 percent protein), 7.44 lbs of dried whey, 5.25 lbs of salt, 1.725 lbs of carob gum, and 0.15 lbs of carrageenan gum was added to the curd. The final mixture, having a composition of about 54.6 percent moisture, about 33.6 percent fat, and about 5.5 percent protein (70/30 casein to whey), was heated to 195° F. for five minutes, cooled to 185° F., held for 20 minutes, and then cooled to 45° F. for packaging.

New York style cheesecake made from this inventive cream cheese was fully cooked in the center with a yield stress of 747 pascals.

Example 4

Cream Cheese Composition With 6.0 Percent Protein

Cream (810 lbs) was mixed with 1390 lbs milk. The mix was then homogenized, pasteurized and cultured overnight with cream cheese cultures. Upon culturing, the mix was separated to obtain 722.85 lbs of curd with a moisture content of 56.5 percent. A blend containing 17.55 lbs of whey protein concentrate (34 percent protein), 2.48 lbs of dried whey, 5.25 lbs of salt, 1.35 lbs of carob gum and 0.53 lbs of xanthan gum was added to the curd. The final mixture, having a composition of about 54.6 percent moisture, about 33.6 percent fat, and about 6.0 percent protein (70/30 casein to whey) was heated to 195° F. for five minutes, cooled to 185° F., held for 20 minutes and then cooled to 45° F. for packaging.

New York style cheesecake made from this inventive cream cheese was fully cooked in the center with a yield stress of 849 pascals.

Example 5

Cream Cheese Composition With 6.0 Percent Protein

In another example, cream (708 lbs) was mixed with 1491 lbs milk. The mix was pasteurized, homogenized, and cultured overnight with cream cheese cultures. Upon culturing, the mix was separated to obtain 721.6 lbs of curd with a moisture content of 56.6 percent. A blend containing 21.3 lbs of whey protein concentrate (34 percent protein), 5.25 lbs of salt, 1.725 lbs of carob gum and 0.15 lbs of carrageenan gum was added to the curd. The final mixture, having a composition of about 54.6 percent moisture, about 33.6 percent fat, and about 6.0 percent protein (70/30 casein to whey) was heated to 195° F. for five minutes, cooled to 185° F., held for 20 minutes and then cooled to 45° F. for packaging.

New York style cheesecake made from this inventive cream cheese was fully cooked in the center with a yield stress of 1024 pascals.

All references cited herein are fully incorporated by reference. Having now fully described the invention, it will be understood by those of skill in the art that the invention may be performed within a wide and equivalent range of conditions, parameters and the like, without effecting the spirit or scope of the invention or any embodiment thereof.

What is claimed is:

1. A low protein cream cheese composition comprising:
   (a) about 33 to about 40 percent fat;
   (b) about 50 to about 55 percent moisture;
   (c) less than about 6.5 percent protein; and
   (d) a stabilizer composition comprising about 0.1 to about 0.5 percent of a first stabilizer and about 0.01 to about 0.15 percent of a second stabilizer, wherein the first stabilizer is selected from the group consisting of carob gum and tara gum and the second stabilizer is selected from the group consisting of xanthan gum, carrageenan, maltodextrin, pectin, inulin, starch, gelatin, and agar, the relative amounts of the fat, the moisture, the protein and the first and the second stabilizer being balanced such that the low protein cream cheese composition provides a cheesecake having a yield stress of above 625 pascals at the center of the cheesecake.

2. The low protein cream cheese composition of claim 1, wherein the first stabilizer is carob gum at about 0.15 to about 0.35 percent and the second stabilizer is xanthan gum at about 0.06 to about 0.15 percent.

3. The low protein cream cheese composition of claim 1, wherein the low protein cream cheese composition contains about 5 to about 6 percent protein and the cheesecake is a New York style cheesecake.

4. The low protein cream cheese composition of claim 2, wherein the low protein cream cheese composition contains about 5 to about 6 percent protein.

5. The low protein cream cheese composition of claim 1, wherein at least 25 percent of the protein is whey protein.

6. The low protein cream cheese composition of claim 2, wherein at least 25 percent of the protein is whey protein.

7. The low protein cream cheese composition of claim 3, wherein at least 25 percent of the protein is whey protein.

8. The low protein cream cheese composition of claim 4, wherein at least 25 percent of the protein is whey protein.

9. The low protein cream cheese composition of claim 1, wherein the first stabilizer is carob gum, wherein the second stabilizer is xanthan gum, and wherein the stabilizer composition further comprises a third stabilizer selected from the group consisting of carrageenan, maltodextrin, pectin, inulin, starch, gelatin, and agar.

10. The low protein cream cheese composition of claim 5, wherein the first stabilizer is carob gum, wherein the second stabilizer is xanthan gum, and wherein the stabilizer composition further comprises a third stabilizer selected from the group consisting of carrageenan, maltodextrin, pectin, inulin, starch, gelatin, and agar.

11. The low protein cream cheese composition of claim 6, wherein the first stabilizer is carob gum, wherein the second stabilizer is xanthan gum, and wherein the stabilizer composition further comprises a third stabilizer selected from the group consisting of carrageenan, maltodextrin, pectin, inulin, starch, gelatin, and agar.

12. The low protein cream cheese composition of claim 7, wherein the first stabilizer is carob gum, wherein the second stabilizer is xanthan gum, and wherein the stabilizer composition further comprises a third stabilizer selected from the group consisting of carrageenan, maltodextrin, pectin, inulin, starch, gelatin, and agar.

13. The low protein cream cheese composition of claim 8, wherein the first stabilizer is carob gum, wherein the second stabilizer is xanthan gum, and wherein the stabilizer composition further comprises a third stabilizer selected from the group consisting of carrageenan, maltodextrin, pectin, inulin, starch, gelatin, and agar.

14. The low protein cream cheese composition of claim 1 wherein the amounts of the fat, the moisture, the protein and the first and the second stabilizer are in relative amounts to provide a cheesecake made with the low protein cream cheese composition a yield stress of in the range of about 800 to about 1200 pascals at the center of the cheesecake, the low protein cream cheese providing the cheesecake with a yield stress higher than a yield stress in a cheesecake made with the same ingredients in the same amounts but using one of the first and second stabilizers.

15. The low protein cream cheese composition of claim 14, wherein the first stabilizer comprises carob gum and the second stabilizer comprises xanthan gum.

16. The low protein cream cheese composition of claim 15, wherein the low protein cream cheese composition contains about 5 to about 6 percent protein and the cheesecake is a New York style cheesecake.

17. A low protein cream cheese composition comprising:
(a) about 33 to about 40 percent fat;
(b) about 50 to about 55 percent moisture;
(c) less than about 6.5 percent protein; and
(d) a stabilizer composition comprising about 0.1 to about 0.5 percent of a first stabilizer comprising carob gum and about 0.01 to about 0.15 percent of a second stabilizer comprising xanthan gum, the relative amounts of the fat, the moisture, the protein and the first and the second stabilizer being balanced such that the low protein cream cheese composition provides a cheesecake having a yield stress in the range of about 800 to about 1200 pascals at the center of the cheesecake, the low protein cream cheese providing the cheesecake with a yield stress higher than a yield stress in a cheesecake made with the same ingredients in the same amounts but using one of the first and second stabilizers.

18. The low protein cream cheese composition of claim 17, wherein the low protein cream cheese composition contains about 5 to about 6 percent protein and the cheesecake is a New York style cheesecake.

19. A method of making a cheesecake, the method comprising:
(1) providing a low protein cream cheese product, the low protein cream cheese product comprising
  (a) about 33 to about 40 percent fat;
  (b) about 50 to about 55 percent moisture;
  (c) less than about 6.5 percent protein; and
  (d) a stabilizer composition comprising about 0.1 to about 0.5 percent of a first stabilizer and about 0.01 to about 0.15 percent of a second stabilizer, wherein the first stabilizer is selected from the group consisting of carob gum and tara gum and the second stabilizer is selected from the group consisting of xanthan gum, carrageenan, maltodextrin, pectin, inulin, starch, gelatin, and agar, the relative amounts of the fat, the moisture;
(2) combining the low protein cream cheese product with cheesecake ingredients to provide a cheesecake mixture;
(3) introducing the cheesecake mixing into a cheesecake crust to provide an unbaked cheesecake; and
(4) baking the unbaked cheesecake to provide a cheesecake having a yield stress of above 625 pascals at the center of the cheesecake.

20. The method of claim 19, wherein the first stabilizer is carob gum at about 0.15 to about 0.35 percent and the second stabilizer is xanthan gum at about 0.06 to about 0.15 percent.

21. The method of claim 19, wherein the low protein cream cheese composition contains about 5 to about 6 percent protein and the cheesecake is a New York style cheesecake.

22. The method of claim 19, wherein at least 25 percent of the protein is whey protein.

* * * * *

UNITED STATES PATENT AND TRADEMARK OFFICE
CERTIFICATE OF CORRECTION

PATENT NO. : 7,611,743 B2  Page 1 of 1
APPLICATION NO. : 11/062376
DATED : November 3, 2009
INVENTOR(S) : Laye et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this

Twelfth Day of October, 2010

David J. Kappos
*Director of the United States Patent and Trademark Office*